United States Patent
Gou et al.

(10) Patent No.: US 11,245,564 B2
(45) Date of Patent: Feb. 8, 2022

(54) METHOD AND DEVICE FOR DETERMINING SEQUENCE GROUP AND CYCLIC SHIFT

(71) Applicant: XI'AN ZHONGXING NEW SOFTWARE CO., LTD., Shaanxi (CN)

(72) Inventors: Wei Gou, Guangdong (CN); Peng Hao, Guangdong (CN); Bao Zhao, Guangdong (CN); Xianghui Han, Guangdong (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 16/764,703

(22) PCT Filed: Nov. 9, 2018

(86) PCT No.: PCT/CN2018/114785
§ 371 (c)(1),
(2) Date: May 15, 2020

(87) PCT Pub. No.: WO2019/096067
PCT Pub. Date: May 23, 2019

(65) Prior Publication Data
US 2021/0176110 A1    Jun. 10, 2021

(30) Foreign Application Priority Data

Nov. 17, 2017    (CN) .......................... 201711144740.2

(51) Int. Cl.
*H04L 27/26* (2006.01)
*H04B 1/713* (2011.01)
*H04L 5/00* (2006.01)

(52) U.S. Cl.
CPC ......... *H04L 27/2678* (2013.01); *H04B 1/713* (2013.01); *H04L 5/0012* (2013.01); *H04L 27/2602* (2013.01)

(58) Field of Classification Search
None
See application file for complete search history.

(56) References Cited

U.S. PATENT DOCUMENTS 8,705,653 B2 *  4/2014  Han ...................... H04L 5/0007
                                                            375/295
8,804,647 B2 *  8/2014  Ko ....................... H04J 13/0062
                                                            370/329
(Continued)

FOREIGN PATENT DOCUMENTS

CN    102696193 A  *  9/2012  .......... H04L 5/0016
CN    102696193 A     9/2012
(Continued)

OTHER PUBLICATIONS

3GPP TS 136 211—LTE; E-UTRA—Physical channels and modulation (3GPP TS 36.211 version 8.7.0 Release 8, Jun. 2009) (Year: 2009).*

(Continued)

*Primary Examiner* — Berhanu Tadese
(74) *Attorney, Agent, or Firm* — Kacvinsky Daisak Bluni PLLC

(57) ABSTRACT

Provided are a method and device for determining a sequence group and a method and device for determining a cyclic shift. The method includes: determining a symbol index of a first specified orthogonal frequency division multiplexing (OFDM) symbol in a scheduling unit; and determining a sequence group or cyclic shift used by a channel or a signal according to the symbol index.

14 Claims, 2 Drawing Sheets

(56) References Cited

U.S. PATENT DOCUMENTS

| | | | | |
|---|---|---|---|---|
| 8,868,996 B2* | 10/2014 | Kim | ...................... | H04L 1/1893 |
| | | | | 714/748 |
| 9,401,788 B2* | 7/2016 | Park | ...................... | H04L 5/0048 |
| 2011/0206089 A1* | 8/2011 | Cho | .................. | H04W 72/0413 |
| | | | | 375/141 |
| 2012/0099545 A1* | 4/2012 | Han | ...................... | H04L 1/0028 |
| | | | | 370/329 |
| 2012/0106478 A1* | 5/2012 | Han | ...................... | H04W 52/58 |
| | | | | 370/329 |
| 2012/0113908 A1* | 5/2012 | Jen | ....................... | H04W 52/365 |
| | | | | 370/329 |
| 2012/0113909 A1* | 5/2012 | Jen | ....................... | H04L 5/0094 |
| | | | | 370/329 |
| 2012/0269138 A1* | 10/2012 | Han | ...................... | H04L 1/1671 |
| | | | | 370/329 |
| 2012/0294272 A1* | 11/2012 | Han | ...................... | H04L 1/1854 |
| | | | | 370/329 |
| 2012/0300726 A1* | 11/2012 | Han | .................. | H04W 72/0413 |
| | | | | 370/329 |
| 2012/0300741 A1* | 11/2012 | Han | ...................... | H04L 1/1893 |
| | | | | 370/329 |
| 2012/0309405 A1* | 12/2012 | Parkvall | .................. | H04W 4/08 |
| | | | | 455/452.1 |
| 2012/0320813 A1* | 12/2012 | Han | ...................... | H04L 1/0073 |
| | | | | 370/311 |
| 2012/0320880 A1* | 12/2012 | Han | ....................... | H04L 5/001 |
| | | | | 370/335 |
| 2013/0010742 A1* | 1/2013 | Han | .................. | H04W 72/0413 |
| | | | | 370/329 |
| 2013/0022017 A1* | 1/2013 | Han | .................... | H04L 27/2636 |
| | | | | 370/329 |
| 2013/0022019 A1* | 1/2013 | Han | ...................... | H04L 5/0069 |
| | | | | 370/329 |
| 2013/0039285 A1* | 2/2013 | Sorrentino | .......... | H04L 27/2613 |
| | | | | 370/329 |
| 2013/0039307 A1* | 2/2013 | Han | .................... | H04W 52/146 |
| | | | | 370/329 |
| 2013/0039334 A1* | 2/2013 | Han | ...................... | H04L 5/0007 |
| | | | | 370/330 |
| 2013/0039387 A1* | 2/2013 | Qu | ........................ | H04L 5/0023 |
| | | | | 375/141 |
| 2013/0100919 A1* | 4/2013 | Han | ...................... | H04W 99/00 |
| | | | | 370/329 |
| 2013/0107852 A1* | 5/2013 | Han | ........................ | H04L 5/001 |
| | | | | 370/329 |
| 2013/0107854 A1* | 5/2013 | Han | ...................... | H04L 5/0053 |
| | | | | 370/330 |
| 2013/0121266 A1* | 5/2013 | Ko | ...................... | H04L 27/2613 |
| | | | | 370/329 |
| 2013/0136071 A1* | 5/2013 | Han | ...................... | H04L 5/0053 |
| | | | | 370/329 |
| 2013/0148613 A1* | 6/2013 | Han | ...................... | H04B 7/0626 |
| | | | | 370/329 |
| 2013/0176982 A1* | 7/2013 | Han | ...................... | H04L 1/0073 |
| | | | | 370/329 |
| 2013/0223396 A1* | 8/2013 | Han | .................. | H04W 72/0413 |
| | | | | 370/329 |
| 2013/0235853 A1* | 9/2013 | Papasakellariou | .... | H04L 5/0053 |
| | | | | 370/336 |
| 2013/0294353 A1* | 11/2013 | Han | .................. | H04W 72/0406 |
| | | | | 370/329 |
| 2013/0315212 A1* | 11/2013 | Sorrentino | ........ | H04W 72/0413 |
| | | | | 370/336 |
| 2013/0343316 A1* | 12/2013 | Pajukoski | ............. | H04L 5/0073 |
| | | | | 370/329 |
| 2014/0029584 A1* | 1/2014 | Qu | ..................... | H04W 72/042 |
| | | | | 370/336 |
| 2014/0092832 A1* | 4/2014 | Han | ...................... | H04L 1/0073 |
| | | | | 370/329 |
| 2014/0192756 A1* | 7/2014 | Baldemair | ............ | H04L 5/0039 |
| | | | | 370/329 |
| 2014/0211736 A1* | 7/2014 | Noh | .................. | H04W 56/0005 |
| | | | | 370/329 |
| 2014/0219202 A1* | 8/2014 | Kim | .................. | H04W 72/0413 |
| | | | | 370/329 |
| 2014/0226581 A1* | 8/2014 | Nam | ...................... | H04L 1/1893 |
| | | | | 370/329 |
| 2014/0307661 A1* | 10/2014 | Wu | ...................... | H04J 11/0069 |
| | | | | 370/329 |
| 2014/0321406 A1* | 10/2014 | Marinier | ........... | H04W 72/0413 |
| | | | | 370/329 |
| 2014/0376356 A1* | 12/2014 | Park | ...................... | H04L 27/2613 |
| | | | | 370/203 |
| 2014/0376484 A1* | 12/2014 | Park | ...................... | H04B 7/0452 |
| | | | | 370/329 |
| 2014/0376486 A1* | 12/2014 | Lee | .................. | H04W 74/0833 |
| | | | | 370/329 |
| 2015/0023270 A1* | 1/2015 | Park | ...................... | H04L 5/0048 |
| | | | | 370/329 |
| 2015/0036607 A1* | 2/2015 | Park | ...................... | H04L 5/0035 |
| | | | | 370/329 |
| 2017/0041932 A1* | 2/2017 | Chae | ........................ | H04B 7/26 |
| 2017/0099174 A1* | 4/2017 | Kim | .................. | H04L 27/2607 |
| 2017/0288848 A1* | 10/2017 | Lei | ...................... | H04L 27/2656 |
| 2019/0149365 A1* | 5/2019 | Chatterjee | ........... | H04L 25/0226 |
| | | | | 370/329 |
| 2020/0187265 A1* | 6/2020 | Luo | ...................... | H04L 27/2602 |
| 2020/0213989 A1* | 7/2020 | Choi | .................. | H04W 72/0446 |

FOREIGN PATENT DOCUMENTS

| | | | | | |
|---|---|---|---|---|---|
| CN | | 103312399 A | * | 9/2013 | .......... H04W 72/042 |
| CN | | 103312399 A | | 9/2013 | |
| CN | | 104579545 A | * | 4/2015 | ........... H04L 1/1854 |
| CN | | 104579545 A | | 4/2015 | |
| CN | | 106233658 A | | 12/2016 | |
| EP | | 2571182 A2 | | 3/2013 | |
| EP | | 2753017 A1 | | 7/2014 | |
| JP | | 2014011806 A | | 1/2014 | |
| WO | | 2017092535 A1 | | 6/2017 | |
| WO | | WO-2017092535 A1 | * | 6/2017 | ............. H04B 1/707 |
| WO | | WO-2017099521 A | * | 6/2017 | ............. H04L 27/26 |
| WO | | WO-2019096067 A1 | * | 5/2019 | ........... H04L 5/0012 |

OTHER PUBLICATIONS

3GPP TS 136 211—LTE; E-UTRA—Physical channels and modulation (3GPP TS 36.211 version 11.2.0 Release 11, Apr. 2013) (Year: 2013).*

International Search Report for the International Patent Application No. PCT/CN2018/114785, dated Jan. 29, 2019, 2 pages.

Author Unknown., "3rd Generation Partnership Project; Technical Specification Group Radio Access Network; Evolved Universal Terrestrial Radio Access (E-UTRA); Physical channels and modulation (Release 14)" 3GPP TS 36.211 v14.4.0 (Sep. 2017).

Japanese Office Action for the Japanese Patent Application No. 2020527748, dated Aug. 3, 2021, 9 pages.

European Search Report and Written Opinion for the European Patent Application No. 18879746, dated Jul. 5, 2021, 6 pages.

Ericsson., "Introduction of Shortened processing time and shortened TTI into 36.211" 3GPP TSG-RAN1 Meeting #90b—Prague, Czech. Rep., Oct. 9-13, 2017—R1-1718911, 84 pages.

Search Report for the Chinese Application No. 2017111447402 dated Feb. 2, 2021, 3 pages.

Office Action for the Chinese Application No. 2017111447402 dated Feb. 2, 2021, 14 pages.

MediaTek Inc., "Interference management in NR" 3GPP TSG RAN WG1 Meeting #88bis, Spokane, USA, Apr. 3-7, 2017—R1-1704450, 26 pages.

3rd Generation Partnership Project; Technical Specification Group Radio Access Network; Evolved Universal Terrestrial Radio Access (E-URTA); Physical channels and modulation (Release 14), 198 pages.

(56) References Cited

OTHER PUBLICATIONS

Office Action for the Korean Patent Application No. 10-2020-7017076, dated Dec. 2, 2021, 5 pages.

\* cited by examiner

_US 11,245,564 B2_

METHOD AND DEVICE FOR DETERMINING SEQUENCE GROUP AND CYCLIC SHIFT

CROSS-REFERENCE TO RELATED APPLICATIONS

This is a U.S. National Stage Application, filed under 35 U.S.C. 371, of International Patent Application No. PCT/CN2018/114785, filed on Nov. 9, 2018, which claims priority to Chinese patent application No. 201711144740.2 filed on Nov. 17, 2017, contents of both of which are incorporated herein by reference in their entireties.

TECHNICAL FIELD

The present disclosure relates to, but is not limited to, the field of communications.

BACKGROUND

In the related art, in a new generation mobile communication system, that is, in a new radio (NR) system, how a physical uplink control channel (PUCCH) determines its own sequence group is inconclusive. Specifically, a PUCCH format is provided in the NR system, in which ACK information, NACK information, and reference signal (RS) information fed back by a user equipment (UE) are carried through different cyclic shifts (CSs) of a sequence. How to determine the sequence group of PUCCH is inconclusive.

In the related art, in the NR system, a code block group (CBG) retransmission mechanism is supported, i.e., the UE may feed back hybrid automatic repeat request-acknowledge (HARQ-ACK) according to the CBG. The base station retransmits the CBG that has not been decoded correctly without retransmitting the entire transport block (TB) (generally, one TB can include multiple CBGs), which facilitate reducing retransmitted data amount.

Further, the following is also supported in the NR system. If the UE is configured with a CBG retransmission mechanism, when the base station uses fallback DCI (a DCI format) to schedule the TB for the UE, if the UE feedbacks HARQ-ACK for the TB without multiplexing with other HARQ-ACK, the UE should feedback TB-level HARQ-ACK. That is to say, in the above case, CBG-level HARQ-ACK is invalid.

However, this also brings another problem. If the UE is configured with the CBG retransmission mechanism, the base station uses fallback downlink control information (DCI) to schedule the TB for the UE, and the UE feeds back HARQ-ACK for the TB and the v is multiplexed with other HARQ-ACKs, how the UE forms the HARQ-ACK for this TB is inconclusive.

In the NR system, the PUCCH resource allocation is being discussed. The following content is basically determined.

The PUCCH of the NR is configured with a start symbol and a number of continuous symbols, whether frequency hops, a starting CS index in a scheduling unit (such as a slot) to determine specific resources when the PUCCH is transmitted. For example, a PUCCH can be started from a certain symbol in the scheduling unit, last for N symbols, and frequency hops, a starting CS index, etc. The start symbol of the PUCCH in the scheduling unit is varying and is configured by the base station. The number of PUCCH symbols is also configured by the base station. After frequency hop, a symbol position of each frequency hop (which can be expressed as hop) also varies. In the existing art, in LTE, the starting position of the PUCCH in a subframe is fixed, the number of symbols and the frequency hop position are also fixed.

For some PUCCHs in the NR system, it carries ACK and/or NACK bit information through orthogonal sequences. For example, different CSs in a sequence (which is referred to as a sequence group or a base sequence) carry ACK information NACK, and RS information, how to determine the sequence group used by the channel or the signal such as the PUCCH is inconclusive.

In the existing art, there is no effective solution at present for the problem that the sequence group or the CS used by the channel or the signal cannot be determined.

SUMMARY

Embodiments of the present disclosure provide a method and device for determining a sequence group and a method and device for determining a cyclic shift (CS).

According to an embodiment of the present disclosure, a method for determining a sequence group is provided. The method includes: determining a symbol index of a first specified orthogonal frequency division multiplexing (OFDM) symbol in a scheduling unit; and determining a sequence group used by a channel or a signal on the scheduling unit according to the symbol index.

According to another embodiment of the present disclosure, a method for determining a sequence group is further provided. The method includes: acquiring a plurality of symbol groups in the scheduling unit in which a channel or a signal is located; acquiring a plurality of sequence groups used by the scheduling unit according to the plurality of symbol groups; and using the plurality of sequence groups on the channel or the signal according to a preset rule.

According to another embodiment of the present disclosure, a method for determining a CS is further provided. The method includes: determining a symbol index of a fifth specified orthogonal frequency division multiplexing (OFDM) symbol in a scheduling unit; and determining a CS used by a channel or a signal on the scheduling unit according to the symbol index.

According to another embodiment of the present disclosure, a method for determining a CS is further provided. The method includes: acquiring a plurality of symbol groups in a scheduling unit in which a channel or a signal is located; acquiring a plurality of CSs used by the scheduling unit according to the plurality of symbol groups; and using the plurality of CSs on the channel or the signal according to a preset rule.

According to another embodiment of the present disclosure, a device for determining a sequence group is further provided. The device includes: a first determination module, which is configured to determine a symbol index of a first specified orthogonal frequency division multiplexing (OFDM) symbol in a scheduling unit; and a second determination module, which is configured to determine a sequence group used by a channel or a signal on the scheduling unit according to the symbol index.

According to another embodiment of the present disclosure, a device for determining a sequence group is further provided. The device includes: a first acquisition module, which is configured to acquire a plurality of symbol groups in a scheduling unit in which a channel or a signal is located; a second acquisition module, which is configured to acquire a plurality of sequence groups used by the scheduling unit according to the plurality of symbol groups; and a first application module, which is configured to use the plurality of sequence groups on the channel or the signal according to a preset rule According to another embodiment of the present disclosure, a device for determining a CS is further provided. The device includes: a third determination module, which is configured to determine a symbol index of a fifth specified orthogonal frequency division multiplexing (OFDM) symbol in a scheduling unit; and a fourth determination module, which is configured to determine a CS used by a channel or a signal on the scheduling unit according to the symbol index.

According to another embodiment of the present disclosure, a device for determining a CS is further provided. The device includes: a third acquisition module, which is configured to acquire a plurality of symbol groups in a scheduling unit in which a channel or a signal is located; a fourth acquisition module, which is configured to acquire a plurality of CSs used by the scheduling unit according to the plurality of symbol groups; and a second application module, which is configured to use the plurality of CSs on the channel or the signal according to a preset rule.

According to another embodiment of the present disclosure, a storage medium is further provided. The storage medium includes a stored program which, when executed, executes the method for determining the sequence group or the method for determining the CS.

According to another embodiment of the present disclosure, a processor is further provided. The processor is configured to execute the method for determining the sequence group or the CS when execute the program.

Through the embodiment of the present disclosure, a symbol index of a first specified orthogonal frequency division multiplexing (OFDM) symbol in a scheduling unit is acquired; and a sequence group used by a channel or a signal on the scheduling unit is determined according to the symbol index. Through the above technique solution, a problem in the related art that the sequence group or the CS used by the channel or the signal cannot be determined is solved, thereby determining the sequence group or the CS used by the channel or the signal according to the symbol index of the specified OFDM in the scheduling unit.

BRIEF DESCRIPTION OF DRAWINGS

The drawings described herein are used to provide a further understanding of the present disclosure, and form a part of the present application. The exemplary embodiments and descriptions thereof in the present disclosure are used to explain the present disclosure. In the drawings.

DETAILED DESCRIPTION

Embodiment One

Embodiments of the present application provide a mobile communication network (which includes, but is not limited to, a 5G mobile communication network). Network architecture of the network may include a network side device (such as a base station) and a terminal. An information transmission method executable on the above network architecture is provided in the embodiment. It is to be noted that an execution environment of the above information transmission method provided by the embodiment of the present application is not limited to the above network architecture.

Figure 1:
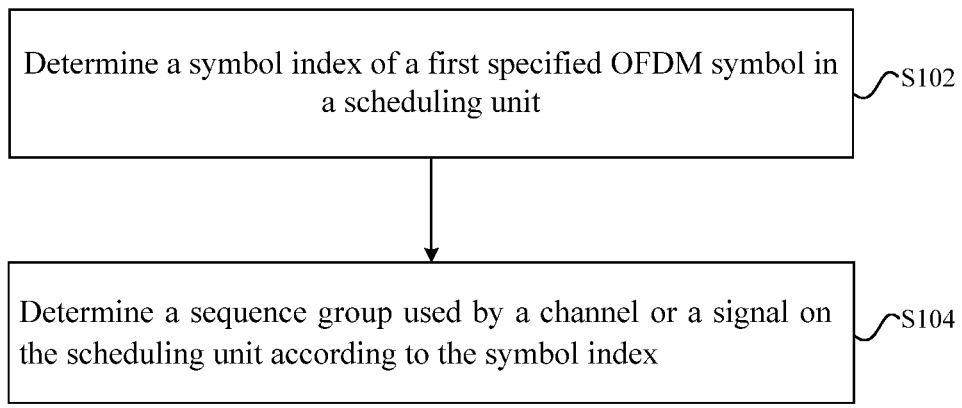
FIG. 1 is a flowchart of a method for determining a sequence group according to an embodiment of the present disclosure.
Figure 2:
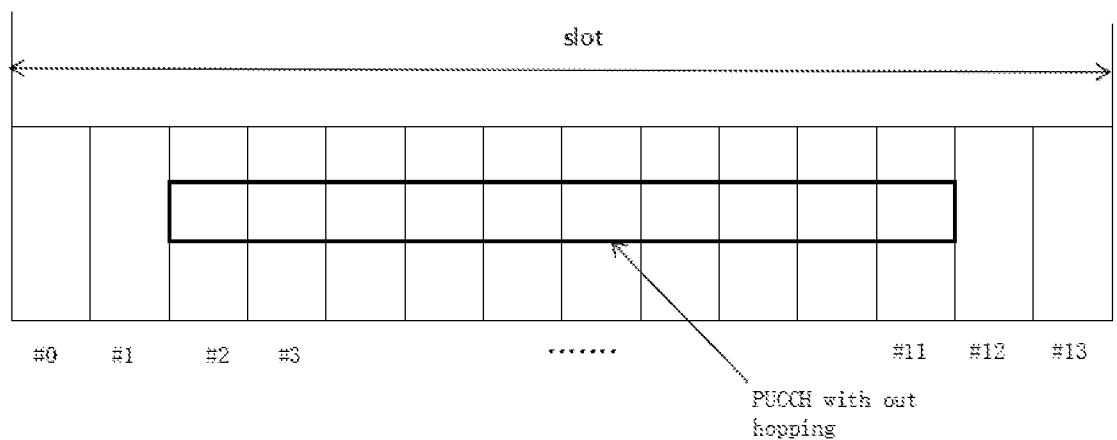
FIG. 2 is a schematic diagram of OFDM according to an embodiment of the present disclosure.

The present embodiment provides a method for determining a sequence group executed on the network architecture described above. FIG. 1 is a flowchart of a method for determining the sequence group according to an embodiment of the present disclosure. FIG. 2 is a schematic diagram of OFDM according to an embodiment of the present disclosure. Referring to FIGS. 1 and 2, the process includes the steps described below.

In step S102, a symbol index in a scheduling unit is determined for a first specified orthogonal frequency division multiplexing (OFDM) symbol.

In step S104, a sequence group used by a channel or a signal on the scheduling unit is determined according to the symbol index.

Through the embodiment of the present disclosure, a symbol index of a first specified orthogonal frequency division multiplexing (OFDM) symbol in a scheduling unit is acquired; and a sequence group used by a channel or a signal on the scheduling unit is determined according to the symbol index. Through the above technique solution, a problem in the related art that the sequence group or the CS used by the channel or the signal cannot be determined is solved, and accordingly the sequence group or the CS used by the channel or the signal is determined according to the symbol index of the specified OFDM in the scheduling unit.

In one embodiment, the above steps may, but are not limited to, be executed by a base station or a terminal.

In an embodiment, a second specified OFDM symbol in the channel or the signal is determined as the first specified OFDM symbol.

Optionally, a first specified OFDM symbol in the channel or the signal is determined as the second specified OFDM symbol. The optional embodiment corresponds to application embodiment 1.

Optionally, in a case where frequency hops occurs on the channel or the signal, the method further includes: according to the symbol index, in the scheduling unit, of a third specified OFDM symbol in one frequency hop, determining the sequence group used by the one frequency hop. The optional embodiment corresponds to application embodiment 2.

In an embodiment, a first OFDM symbol in the frequency hop is determined as the third specified OFDM symbol.

Optionally, a specified symbol in the scheduling unit is configured by base stations on communication parties to be the second specified OFDM symbol. The optional embodiment corresponds to application embodiment 3.

In an embodiment, the step in which the specified symbol in the scheduling unit is configured by the base stations on the communication parties to be the second specified OFDM symbol includes: in a case where a plurality of channels or signals are multiplexed, the base station indicates the plurality of channels or signals to use one of the collectively multiplexed OFDM symbols as the second specified OFDM symbol.

Optionally, in a case where the channel or signal is divided into a plurality of segments, the step in which the sequence group used by the channel or the signal on the scheduling unit is determined according to the symbol index includes: taking one OFDM symbol on each segment of the channel or signal as the second specified OFDM symbol of this segment; determining the sequence group used by this segment of the channel or the signal according to the symbol index corresponding to the second specified OFDM symbol. The optional embodiment may correspond to application embodiment 4.

Optionally, the method further includes: determining, for each OFDM symbol in the channel or signal, the corresponding symbol index in the scheduling unit; and determining the sequence group used by each corresponding OFDM symbol according to the symbol index. The optional embodiment may correspond to application embodiment 6.

Optionally, the method includes: determining a fourth specified uplink OFDM symbol in a scheduling unit where the channel or signal is located is the first specified OFDM symbol. The optional embodiment may correspond to application embodiment 5.

In an embodiment, a first uplink OFDM symbol in the scheduling unit is determined as the fourth specified OFDM symbol.

In an embodiment, in a case where frequency hop occurs on the channel or the signal, the method further includes: determining the sequence groups used by different frequency hops according to the symbol indexes of different uplink OFDM symbols in the scheduling unit.

In an embodiment, the sequence group used by the channel or the signal is determined by the following formula according to the symbol index:

$$f_{gh}(n_s,l) = (\Sigma_{i=0}^{7} c(8(N^*n_s+l)+i) \cdot 2^i) \bmod Q;$$

$$u = (f_{gh}(n_s,l) + f_{ss}) \bmod Q;$$

u denotes an index of the sequence group, Q equals to a total number of sequence groups, a definition of $f_{ss}$ is determined by a cell physical ID, $n_s$ is a serial number of the scheduling unit, and l is the symbol index of the symbol in the scheduling unit, N is a number of symbols included in each scheduling unit; c(i) is a pseudo-random sequence with an initial value of $$\left\lfloor \frac{n_{ID}^{RS}}{30} \right\rfloor;$$

$n_{ID}^{RS}$ is the cell physical ID of the cell, or a virtual cell physical ID configured by a higher layer.

Optionally, the channel or signal includes one of: a PUCCH channel; a physical uplink shared channel (PUSCH) channel; a channel sounding reference signal (SRS); a mini-slot; a channel or a signal scheduled in a slot according to a non-slot.

According to another embodiment of the present disclosure, a method for determining a sequence group is further provided. The method includes the steps described below.

In step one, a plurality of symbol groups in a scheduling unit where a channel or a signal is located are acquired.

In step two, a plurality of sequence groups used by the scheduling unit are acquired according to the plurality of symbol groups.

In step three, the plurality of sequence groups are used on the channel or the signal according to a preset rule.

It is to be added that this embodiment may correspond to the specific embodiment 13.

In an embodiment, the channel or signal includes one of: a PUCCH; a PUSCH; an SRS; a mini-slot; a channel or a signal scheduled in a slot according to a non-slot.

According to another embodiment of the present disclosure, a method for determining a CS is further provided. The method includes the steps described below.

In step one, a symbol index in a scheduling unit is determined for a fifth specified orthogonal frequency division multiplexing (OFDM) symbol.

In step two, a CS used by a channel or a signal on the scheduling unit is determined according to the symbol index.

In an embodiment, a sixth specified OFDM symbol in the channel or the signal is determined as the fifth specified OFDM symbol.

Optionally, a first OFDM symbol in the channel or the signal is determined as the sixth specified OFDM symbol. The optional embodiment may correspond to application embodiment 7.

Optionally, in a case where frequency hop occurs on the channel or the signal, the method further includes: according to the symbol index, in the scheduling unit, of a seventh specified OFDM symbol in one frequency hop, determining the CS used by the frequency hop. The optional embodiment may correspond to application embodiment 8.

In an embodiment, a first OFDM symbol in the frequency hop is determined as the seventh specified OFDM symbol.

Optionally, base stations on communication parties configure that a specified symbol in the scheduling unit is the sixth specified OFDM symbol. The optional embodiment may correspond to application embodiment 9.

In an embodiment, the step in which the base stations on the communication parties configure that a specified symbol in the scheduling unit is the sixth specified OFDM symbol includes: in a case where a plurality of channels or signals are multiplexed, the base station indicates the plurality of channels or signals to use one of the collectively multiplexed OFDM symbols as the sixth specified OFDM symbol.

Optionally, in a case where the channel or signal is divided into a plurality of segments, the step in which the CS used by the channel or the signal on the scheduling unit is determined according to the symbol index includes: for each segment of the channel or signal, taking one OFDM symbol on this segment as the sixth specified OFDM symbol of this segment; and determining the CS used by the segment of the channel or the signal according to the sixth specified OFDM symbol. The optional embodiment may correspond to specific embodiment 10.

Optionally, the method further includes: determining, for each OFDM symbol in the channel or signal, the corresponding symbol index in the scheduling unit; and determining the CS used by each corresponding OFDM symbol according to the symbol index. The optional embodiment may correspond to specific embodiment 12.

Optionally, the method includes: determining an eighth specified uplink OFDM symbol in a scheduling unit where the channel or signal is located as the fifth specified OFDM symbol. The optional embodiment may correspond to application embodiment 11.

In an embodiment, a symbol index corresponding to a first uplink symbol in the scheduling unit is determined as the eighth specified uplink OFDM symbol index.

In an embodiment, in a case where frequency hop occurs on the channel or the signal, the method further includes: determining the CSs used by different frequency hops according to the symbol indexes of different uplink symbols in the scheduling unit.

Optional, the CS used by the channel or the signal is determined by the following formula according to the symbol index:

$$n_{cs}^{cell}(n_s,l)=\Sigma_{i=0}^{7}c(8(N*n_s)+8l+i)\cdot 2^i;$$

$$n_{cs}=(n_{cs}^{cell}(n_s,l)+CS_0) \bmod 12;$$

$n_{CS}$ is the CS used by the channel or the signal, $n_s$ is a serial number of the scheduling unit, l is a symbol index of a symbol in the scheduling unit, N is a number of symbols in each scheduling unit; c(i) is a pseudorandom sequence with an initial value of $$\left\lfloor \frac{n_{ID}^{RS}}{30} \right\rfloor;$$

$n_{ID}^{RS}$ is a cell physical ID of the cell, or a virtual cell physical ID configured by a higher layer, $CS_0$ is an initial CS pre-configured by the base stations of the communication parties.

In an embodiment, the channel or signal includes one of: a PUCCH; a PUSCH; an SRS; a mini-slot; a channel or a signal scheduled in a slot according to a non-slot.

According to another embodiment of the present disclosure, a method for determining a CS is further provided. The method includes the steps described below.

In step one, a plurality of symbol groups in the scheduling unit in which a channel or a signal is located are acquired.

In step two, a plurality of CSs used by the scheduling unit are acquired according to the plurality of symbol groups.

In step three, the plurality of CSs are used on the channel or the signal according to a preset rule.

It is to be added that this optional embodiment may correspond to the application embodiment 13.

Optionally, the channel or signal includes one of: a PUCCH; a PUSCH; an SRS; a mini-slot; a channel or a signal scheduled in a slot according to a non-slot.

The present disclosure will be described below in detail with reference to an application embodiment.

Application embodiments of the present disclosure include the following 14 specific embodiments.

Application Embodiment One

A sequence group for describing a PUCCH is a sequence group calculated according to a symbol position of a start symbol of the sequence group in a slot, and the sequence group is used as the PUCCH (including each frequency hop).

A scheduling unit (such as a slot, which is taken as an example for description) includes 14 OFDM symbols, numbered from 0 to 13. It is assumed that a start symbol of the PUCCH of a user equipment (UE) is configured to be a symbol 2 and the PUCCH lasts for 10 symbols, i.e., symbols used by this PUCCH are symbols 2 to 11. Whether frequency hop occurs on the PUCCH or not is not considered here. Since the start symbol of PUCCH in the slot is varied and the number of continuous symbols is also configured, the frequency hop position of PUCCH is also varied.

The base station and the UE determine the sequence group of the PUCCH according to the following equation. u denotes an index of the sequence group. Q is 30, which equals to a total number of sequence groups. A definition of $f_{ss}$ is determined by a cell physical ID, which may specifically refer to section 5.5.1.3 of 36.211 of the long term evolution (LTE) protocol. $n_s$ is a serial number of the scheduling unit, the value is taken according to the definition in the NR system. l is the symbol index ranging from 0 to 13. N is a number of symbols included in each slot and is 14 in the NR. c(i) is a pseudo-random sequence with an initial value of $$\left\lfloor \frac{n_{ID}^{RS}}{30} \right\rfloor;$$

$n_{ID}^{RS}$ is the cell physical ID of the cell, or a virtual cell physical ID configured by a higher layer.

$$u=(f_{gh}(n_s,l)+f_{ss}) \bmod Q \qquad \text{Equation 1}$$

$$f_{gh}(n_s,l)=(\Sigma_{i=0}c(8(N*n_s+l)+i)\cdot 2^i) \bmod Q \qquad \text{Equation 2}$$

In this way, through Equations 1 and 2, the sequence group corresponding to each OFDM symbol in a slot may be calculated. For the above example, the start symbol of the PUCCH is symbol 2, the sequence group used by this PUCCH is the sequence group calculated when l is 2.

Application Embodiment 2

This embodiment is for PUCCH with frequency hop. A sequence group for describing each frequency hop of the PUCCH is a sequence group calculated according to a symbol position of a start symbol of this frequency hop in a slot, and the sequence group is used as the frequency hop of the PUCCH.

Since the start symbol of the PUCCH in the slot is varied, and a number of continuous symbols is also configured, a frequency hop position of the PUCCH is also varied. In this specific embodiment, for the PUCCH with frequency hop, the sequence group is calculated according to a first symbol of each frequency hop in the slot.

A slot includes 14 OFDM symbols, numbered from 0 to 13. It is assumed that a start symbol of a PUCCH of a user equipment (UE) is configured to be a symbol 2 and the PUCCH lasts for 10 symbols, i.e., symbols used by this PUCCH are symbols 2 to 11, and the frequency hop occurs. A frequency hop pattern is 5/5 frequency hop, i.e., first 5 symbols are a frequency hop, last 5 symbols are a frequency hop, which corresponds to the slot, i.e., the frequency hop symbol of the PUCCH is between symbol 6 and symbol 7.

The base station and the UE calculate the sequence group according to the equations 1 and 2 in the application embodiment one. When the sequence group of a first frequency hop is calculated, l is 2. When the sequence group of a second frequency hop is calculated, l is 7. The values of other parameters are determined according to the agreement. Specific calculation is not repeated.

Application Embodiment 3

The sequence group of the PUCCH sequence group may be calculated according to the symbol position of a certain symbol in the slot, and used for the entire PUCCH. The symbol position of a certain symbol in the slot may be configured by the base station.

Here, the sequence group used by the PUCCH is calculated according to a certain symbol, the main purpose is to support the possible flexible reuse. For example, one PUCCH has 10 symbols and another PUCCH has 6 symbols. It is assumed here that there is no frequency hop (the principle described below is also applicable to the case where there is frequency hop). At this time, the 6-symbol PUCCH is multiplexed in last 6 symbols of the 10-symbol PUCCH and uses same resources, and the multiplex is implemented through a cyclic shift or combining a manner of orthogonal cover code (OCC). It is required that these two PUCCHs have the same sequence group in the multiplexed 6 symbols. Therefore, at this time, the sequence group of the 10-symbol PUCCH is calculated by using the symbol position of the first symbol in the slot in the multiplexed 6 symbols (the calculation method is the same as the application embodiment 1). The sequence group of the 6-symbol PUCCH is calculated according to the symbol position of the first symbol of the PUCCH in the slot (which can be understood that a certain symbol is defined as the first symbol of the PUCCH at this time). This ensures that two multiplexed PUCCHs use the same sequence group (the same sequence group is in the 6 multiplexed symbols, and first 4 symbols the 10-symbol PUCCH may also use the same sequence groups as last 6 symbols, and calculation may be performed according to the symbol position of the first symbol of the PUCCH in the slot).

A certain symbol described here is configured by the base station. For example, the base station expects to use the multiplexing mode for the UE with 10 symbols. The base station can notify the UE that the sequence group of its PUCCH is calculated according to a fifth symbol in the 10 symbols (in actual calculation, the fifth symbol needs to be converted into a symbol position of the fifth symbol in the slot). Then the base station and the UE calculate the sequence group according to the equations 1 and 2 in the application embodiment 1. Specific calculation is not repeated.

Application Embodiment 4

For a PUCCH, a sequence group may be calculated according to a symbol position of a symbol in a slot. The sequence group is used continuously starting from a certain symbol until a new sequence group (this new sequence group is calculated according to the symbol position of another symbol in the slot).

This is actually somewhat similar to the application embodiment 3.

For example, a 12-symbol PUCCH (marked as a PUCCH1) is divided into segments and multiplexed with 3 PUCCHs (which are marked as a PUCCH2, a PUCCH3 and a PUCCH4). Each PUCCH has four symbols. For example, the PUCCH2 and the PUCCH1 are multiplexed in first 4 symbols of the PUCCH1, the PUCCH3 and the PUCCH1 are multiplexed in middle 4 symbols of the PUCCH1, the PUCCH4 and the PUCCH1 are multiplexed in last 4 symbols of the PUCCH1. The multiplexed PUCCHs use the same sequence group in the multiplexed symbols. Then at this time, the sequence group of the PUCCH1 needs to be calculated according to 3 segments. The sequence group of the first segment is calculated according to the symbol position of the first symbol of the PUCCH1, the sequence group is used in first 4 symbols of the PUCCH1. The sequence group of middle 4 symbols of the PUCCH1 is calculated according to the symbol position of a fifth symbol of the PUCCH1 in the slot. This sequence group is used in the middle 4 symbols of the PUCCH1 (the fifth to eighth symbols of the PUCCH1). The sequence group of the last 4 symbols of the PUCCH1 is calculated according to the symbol position of a ninth symbol of the PUCCH1 in the slot. This sequence group is used in the last 4 symbols of the PUCCH1.

The sequence groups of PUCCH2, PUCCH3 and PUCCH4 are calculated according to symbol positions of first symbols in the slot.

In this way, according to Equations 1 and 2 in the application example 1, the sequence groups of different segments of the PUCCH1 may be calculated separately. Specific data exemplified in this application embodiment may be replaced with other reasonable data, and a general description is adopted.

Application Embodiment 5

A sequence group for describing a PUCCH is a sequence group calculated according to a certain uplink symbol position of the PUCCH in a slot, and the sequence group is used as the PUCCH (including each frequency hop).

Here, a certain uplink symbol position in the slot may be a first uplink symbol position in the slot. In this application embodiment, when the sequence group of the PUCCH is calculated, the symbol position of a first uplink symbol in the slot where the PUCCH is located is used. For example, in the NR system, attributes of symbols in each slot (i.e., uplink symbols or downlink symbols) are configurable by the base station, so the symbol position and the number of uplink symbols included in the slot are varying. Here, if a PUCCH is in a slot, and the first uplink symbol in the slot is a symbol 3 (symbol are numbered from 0 to 13), then the sequence group of this PUCCH is calculated using the symbol 3. For example, using Equations 1 and 2 in the application embodiment 1, l at this time is 3. The calculated sequence group is applied to this PUCCH (here regardless of whether the PUCCH frequency hops).

Further, if it is required that the sequence group changes between different frequency hops, the sequence group obtained above is used for the first frequency hop of the PUCCH. The sequence group calculated according to the second uplink symbol position in the slot is used for a second frequency hop of the PUCCH.

In the NR system, the UE may obtain attributes of symbols in the slot type according to relevant signaling.

Application Embodiment 6

A sequence group describing a PUCCH is calculated according to a symbol position of each symbol of the PUCCH in a slot. The sequence group in each symbol of the PUCCH is obtained here, regardless of whether frequency hop occurs on the PUCCH.

In this application embodiment, for example, a 5-symbol PUCCH uses part of symbols in a slot, assuming that the 5 symbols are a symbol 2 to a symbol 6 of the slot, then the sequence group of the PUCCH is calculated according to the symbol. Each symbol has different sequence groups. For example, the sequence groups used by first to fifth symbols of this PUCCH are respectively calculated according to the symbols 2 to 6 in the slot.

In this way, the sequence group used by each symbol of the PUCCH is different and is calculated according to the symbol position of each symbol of PUCCH in the slot.

Specific calculations may use Equations 1 and 2 in the application embodiment 1.

Here, the symbols in the slot may also be grouped, and the sequence group used by the symbol group is calculated according to the symbol position of a first symbol of each group in the slot. In this way, for a PUCCH, if the symbol of the PUCCH falls in a symbol group, the symbol of the PUCCH uses the sequence group corresponding to the symbol group. For example, the symbols in the slot are divided into 7 groups. Each group has 2 symbols. Symbols 0 and 1 in the slot are a first symbol group, symbols 2 and 3 are a second symbol group, and symbols 4 and 5 are a third symbol group, . . . . If the PUCCH includes 8 symbols, the start symbol is symbol 0 in the slot and last for symbol 7. Then at this time, the sequence group of first 2 symbols of the PUCCH is the sequence group calculated by the first symbol group in the slot, and sequentially the sequence group of another 2 symbols of the PUCCH is calculated by the second symbol group in the slot, the sequence group of yet another 2 symbols of the PUCCH is calculated by the third symbol group in the slot, and the sequence group of yet another 2 symbols of the PUCCH is calculated by the fourth symbol group in the slot.

Application Embodiment 7

A CS for describing a PUCCH is $n_{cs}^{cell}(n_s, 1)$, that is calculated according to a symbol position of a start symbol in a slot, and then combined with an initial $CS_0$ that configured by a base station to calculate the CS as the PUCCH (including each frequency hop). l is the symbol index of the start symbol in the slot.

Basic concepts are similar to the application embodiment 1 except for the different specific calculation method and object.

$n_{cs}^{cell}(n_s,l)$ is calculated according to Equation 3. $n_s$ is a serial number of the scheduling unit, the value is taken according to the definition in the NR system. l is the symbol number ranging from 0 to 13. N is a number of symbols included in each slot and is 14 in the NR. c(i) is a pseudo-random sequence with an initial value of $$\left\lfloor \frac{n_{ID}^{RS}}{30} \right\rfloor.$$

$n_{ID}^{RS}$ is the cell physical ID of the cell, or a virtual cell physical ID configured by a higher layer.

Combining $n_{cs}^{cell}(n_s,l)$ with $CS_0$, the CS used by the corresponding symbol l may be calculated according to Equation 4. $CS_0$ is configured by the base station to the UE.

$$n_{cs}^{cell}(n_s,l) = \Sigma_{i=0}^{7} c(8(N \cdot n_s) + 8l + i) \cdot 2^i \quad \text{Equation 3}$$

$$n_{cs} = (n_s, l) + CS_0) \bmod 12 \quad \text{Equation 4}$$

It is assumed that the PUCCH occupies 6 symbols which are symbols 2 to 7 in the slot, the CS of the PUCCH in each symbol is calculated according to the symbol position of the start symbol of the PUCCH in the slot, i.e., the value of l is 2 to calculate the CS and the CS is applied to all symbols of the PUCCH.

Application Embodiment 8

For a frequency-hop PUCCH, the CS for describing each frequency hop of the PUCCH is $n_{cs}^{cell}(n_s,l)$, which is calculated according to a symbol position of a start symbol of each frequency hop in a slot, and then an initial $CS_0$ configured by a base station is combined to calculate the CS as the frequency hop of the PUCCH. l is the symbol index of the start symbol in the slot.

Basic concepts are similar to the application embodiment 2 except for the different specific calculation method and object.

The application embodiment indicates to calculate the CS used in each frequency hop according to each frequency hop of the PUCCH. For example, a PUCCH has 8 symbols from slots 2 to 9 and frequency hops. The first frequency hop is first 4 symbols, and the second frequency hop is last 4 symbols (i.e., a frequency hop position is between symbols 5 and 6 in the slot).

In this case, when calculating the CS of the first frequency hop of the PUCCH, l is 2; when calculating the CS of the second frequency hop, l is 6, and two CSs are respectively obtained according to the calculation equation in the specific embodiment 7 and all symbols of the first frequency hop and the second frequency hop.

Application Embodiment 9

For a CS of a PUCCH, the CS may be obtained according to $n_{cs}^{cell}(n_s, l)$ calculated according to a symbol position of a certain symbol in a slot and an initial $CS_0$ configured by a base station to for the entire PUCCH. The symbol position of a certain symbol in the slot may be configured by the base station. is the symbol index of the start symbol in the slot.

Basic concepts are similar to the application embodiment 3 except for the different specific calculation method and object.

Here, the sequence group used by the PUCCH is calculated according to a certain symbol, the main purpose is to support the possible flexible reuse. For example, one PUCCH has 10 symbols and another PUCCH has 6 symbols. It is assumed here that there is no frequency hopping (the principle described below is also applicable to the case where there is frequency hop). At this time, the 6-symbol PUCCH is multiplexed in last 6 symbols of the 10-symbol PUCCH and uses same resources, and the multiplex is implemented through a cyclic shift or combining a manner of orthogonal cover code (OCC). It is required that these two PUCCHs have the corresponding CS in the multiplexed 6 symbols, so at this time, the CS of the 10-symbol PUCCH is calculated by using the symbol position of the first symbol in the slot in the multiplexed 6 symbols (the calculation method is the same as the application embodiment 7). The CS of the 6-symbol PUCCH is calculated according to the symbol position of the first symbol of the PUCCH in the slot (which can be understood that a certain symbol is defined as the first symbol of the PUCCH at this time). This ensures that the two multiplexed PUCCHs have corresponding CSs.

A certain symbol described here is configured by the base station. For example, the base station expects to use the multiplexing mode for the UE with 10 symbols. The base station can notify the UE that the CS of its PUCCH is calculated according to a fifth symbol in the 10 symbols (in actual calculation, the fifth symbol needs to be converted into a symbol position of the fifth symbol in the slot). Then, the base station and the UE calculate the CS according to the equations 3 and 4 in the specific embodiment 7. Specific calculation is not repeated.

Application Embodiment 10

A CS of a PUCCH may be obtained according to $n_{cs}^{cell}(n_s, l)$ calculated by a symbol position of a certain symbol in a slot and combine with an initial CS configured by a base station. The CS is used from the symbol position of a certain symbol in the slot until there is a new CS (this new CS is calculated according to the symbol position of another symbol in the slot).

Basic concepts are similar to the application embodiment 4 except for the different specific calculation method and object.

For example, a 12-symbol PUCCH (marked as a PUCCH1) is divided into segments and multiplexed with 3 PUCCHs (which are marked as a PUCCH2, a PUCCH3 and a PUCCH4), each of which has four symbols. For example, the PUCCH2 and the PUCCH1 are multiplexed in first 4 symbols of the PUCCH1, the PUCCH3 and the PUCCH1 are multiplexed in middle 4 symbols of the PUCCH1, the PUCCH4 and the PUCCH1 are multiplexed in last 4 symbols of the PUCCH1. The multiplexed PUCCH uses the CS in multiplexed symbols. Then at this time, the CSs of the PUCCH1 need to be calculated according to 3 segments. The CS of the first segment is calculated according to the symbol position of a first symbol of the PUCCH1, the sequence group is used in first 4 symbols of the PUCCH1. The CS of middle 4 symbols of the PUCCH1 is calculated according to a symbol position of a fifth symbol of the PUCCH1 (i.e., the first symbol of each segment) in the slot. The CS is used in the middle 4 symbols of the PUCCH1 (symbols 5 to 8 of the PUCCH1). The CS of the last 4 symbols of the PUCCH1 is calculated according to the symbol position of a ninth symbol of the PUCCH1 in the slot. This CS is used in the last 4 symbols of the PUCCH1.

The CSs of PUCCH2, PUCCH3 and PUCCH4 are calculated according to symbol positions of first symbols in the slot.

In this way, according to Equations 3 and 4 in the application embodiment 7, the CSs of different segments of the PUCCH1 may be calculated separately. Specific data exemplified in this application embodiment may be replaced with other reasonable data, and a general description is adopted.

Application Embodiment 11

A CS for descripting a PUCCH may be obtained according to $n_{cs}^{cell}(n_s, 1)$ calculated by a symbol position of a certain uplink symbol in a slot in which the PUCCH is located and in combination with an initial CS configured by a base station. The CS is used as the PUCCH (including each frequency hop). Here, a certain uplink symbol position in the slot may be a first uplink symbol position in the slot.

Basic concepts are similar to the application embodiment 5 except for the different specific calculation method and object.

Here, a certain uplink symbol position in the slot may be a first uplink symbol position in the slot. In this application embodiment, when the CS of the PUCCH is calculated, the symbol position of a first uplink symbol in the slot where the PUCCH is located is used. For example, in the NR system, attributes of symbols in each slot (i.e., uplink symbols or downlink symbols) are configurable by the base station, so the symbol position and the number of uplink symbols included in the slot are varying. Here, if a PUCCH is in a slot, and the first uplink symbol in the slot is a symbol 3 (symbols are numbered from 0 to 13), then the CS of this PUCCH is calculated using the symbol 3. For example, using Equations 3 and 4 in the application embodiment 7, 1 at this time is 3. The calculated CS is applied to this PUCCH (here regardless of whether the PUCCH frequency hops).

Further, if the CS is required for varying between different frequency hops, the CS obtained above is used for the first frequency hop of the PUCCH. The CS calculated according to the second uplink symbol position in the slot is used for a second frequency hop of the PUCCH.

In the NR system, the UE may obtain attributes of symbols in the slot type according to relevant signaling.

Application Embodiment 12

A CS describing a PUCCH is as follows. $n_{cs}^{cell}(n_s, 1)$ is calculated according to a symbol position of each symbol in a slot, and is combined with an initial CS configured by a base station, regardless of whether frequency hop occurs the PUCCH.

Basic concepts are similar to the application embodiment 6 except for the different specific calculation method and object.

In this application embodiment, for example, a 5-symbol PUCCH uses part of symbols in a slot, assuming the 5 symbols are symbols 2 to 6 of the slot, then the CS of the PUCCH is calculated according to the symbol. Each symbol has different CSs. For example, the CSs used by first to fifth symbols of this PUCCH are respectively calculated according to the symbols 2 to 6 in the slot.

In this way, the CS used by each symbol of the PUCCH is different, and are calculated according to the symbol position of each symbol of PUCCH in the slot. Specific calculations may use Equations 3 and 4 in the application embodiment 7.

Here, the symbols in the slot may also be grouped, and the CS used by the symbol group is calculated according to the symbol position of a first symbol of each group in the slot. In this way, for a PUCCH, if the symbol of the PUCCH falls in a symbol group, the symbol of the PUCCH uses the CS corresponding to the symbol group. For example, the symbols in the slot are divided into 7 groups. Each group has 2 symbols. Symbols 0 and 1 in the slot are a first symbol group, symbols 2 and 3 are a second symbol group, and symbols 4 and 5 are a third symbol group, . . . . If the PUCCH includes 8 symbols, the start symbol is symbol 0 in the slot and last for symbol 7. Then at this time, the CS of first 2 symbols of the PUCCH is the CS calculated by the first symbol group in the slot, and sequentially the CS of another 2 symbols of the PUCCH is calculated by the second symbol group in the slot, the CS of yet another 2 symbols of the PUCCH is calculated by the third symbol group in the slot, and the CS of yet another 2 symbols of the PUCCH is calculated by the fourth symbol group in the slot.

Application Embodiment 13

A method is provided below, which can be used by a transmitting end (a base station) or a receiving end (a UE) to determine a sequence group or a CS of a channel or a signal. For example, a method for determining an uplink or downlink physical channel or signal specifically is as follows (the description is an example to determine the sequence group used by a PUCCH).

First 7 symbols and last 7 symbols in each scheduling unit of a radio frame (or starting with a first symbol in the radio frame, each 7 symbols are numbered with a number, and each scheduling unit in the NR has 14 symbols) are respectively numbered. The numbering starts from 0 and is first 7 symbols in a first slot in the radio frame. The number is marked as Ks. The sequence group corresponding to each Ks is calculated according to Ks, so that each scheduling unit obtains 2 sequence groups. In a case where a UE has only one PUCCH in a scheduling unit and the frequency is not tuned, a first or second sequence group obtained by each scheduling unit is applied to the PUCCH of the UE in the scheduling unit, and specifically applied to which sequence group may be pre-agreed by the base station and the UE or indicated by the base station to the UE.

In a case where the UE has only one PUCCH in a scheduling unit and with frequency hop, the first (or second) sequence group obtained by each scheduling unit is applied to a first frequency hop of the UE's PUCCH in the scheduling unit; the second (or first) sequence group obtained by each scheduling unit is applied to a second frequency hop of the UE's PUCCH in the scheduling unit. If the UE has multiple PUCCHs in the scheduling unit, and all of them frequency hop, the above manner may be used for each PUCCH.

If the UE has multiple PUCCHs in the scheduling unit, and none of them is with frequency hop, the first sequence group obtained by the scheduling unit is applied to all odd (or even) PUCCH (numbered from 0) of the UE in the scheduling unit, and the second sequence group obtained by the scheduling unit is applied to all odd (or even) PUCCH (numbered from 0) of the UE in the scheduling unit.

If the UE has multiple PUCCHs in the scheduling unit, and none of them is with frequency hop, the first sequence group obtained by the scheduling unit is applied to each PUCCH of the UE in the scheduling unit according to a symbol corresponding to a first frequency hop at the time of frequency hopping, and the second sequence group obtained by the scheduling unit is applied to each PUCCH of the UE in the scheduling unit according to a symbol corresponding to a second frequency hop at the time of frequency hopping.

Ks is specifically used, and the calculation equation is as follows.

The base station and the UE calculate the sequence group of the PUCCH according to the following equation. u denotes an index of the sequence group. Q is 30, which equals to a total number of sequence groups. A definition of $f_{ss}$ is determined by a cell physical ID, which may specifically refer to section 5.5.1.3 of 36.211 of the LTE protocol. c(i) is a pseudo-random sequence with an initial value of $$\left\lfloor \frac{n_{ID}^{RS}}{30} \right\rfloor.$$

$n_{ID}^{RS}$ is the cell physical ID of the cell, or a virtual cell physical ID configured by a higher layer.

$$u=(f_{gh}(K_s)+f_{ss}) \bmod Q \qquad \text{Equation 5}$$

$$f_{gh}(K_s)=(\Sigma_{i=0}^{7}(8K_s+i)\cdot 2^i) \bmod Q \qquad \text{Equation 6}$$

Technical features of the above embodiments may be used in combination if not in conflict.

Application Embodiment 14

The specific embodiment 14 provides a method which solves a multiplexing problem between a DMRS and uplink control information of different UEs, such as the multiplexing problem between uplink control information of a UE1 and a DMRS of a UE2. The uplink control information may include ACK/NACK, SR and other channel measurement information. The uplink control information may be carried through a PUCCH. In this way, the embodiment may also solve the multiplexing problem of PUCCHs of different UEs.

A CS0 is assigned to the UE1 (a sequence has different CSs, for example, a sequence with a length of 12 has 12 cyclic shifts, marked as CS0~CS11, the CS number here is just an example, and other CS values are also available, similar to the following) for carrying the ACK or NACK of the UE1, a CS8 is allocated to the UE1 for carrying the DMRS, and a CS4 is allocated to the UE1 for carrying the ACK/NACK and SR. Specifically: the UE1 uses CS0 when only transmitting the ACK or NACK, and the corresponding ACK or NACK information is modulated onto CS0 for transmission. When the UE1 transmits the ACK or NACK and performs an SR request at the same time, such as represented by "1", "1" is modulated onto CS4 for transmission. When the UE1 transmits the ACK or NACK and does not perform the SR request, such as represented by "0", "0" is modulated onto CS4 for transmission (0 is modulated to −1 firstly and then modulated onto CS).

Similar processing is performed on the UE2, and CS0, CS4 and CS8 have the same meaning.

The PUCCH or the uplink control information and the DMRS of the UE1 and the UE2 are multiplexed in the following manner. In the same time-frequency resource, in the first symbol, the UE1 sends the CS of the uplink control information (such as CS0 or CS4 of the UE1), and at the same time, the UE2 transmits the DMRS. In a second symbol, the UE2 sends the CS of the uplink control information (such as CS0 or CS4 of the UE2), and at the same time, the UE1 transmits the DMRS in this symbol.

In this way, in some symbols, the uplink control information of the UE1 and the DMRS of the UE2 are multiplexed by means of different CSs. In other symbols, the uplink control information of the UE2 and the DMRS of the UE1 are multiplexed by means of different CSs. When 2 UEs are provided, 3 CSs are needed in one symbol (such as the example above), so if a length of the sequence is 12, an interval of 3 CSs may at most be 4. When more UEs are provided, the above method may still be used. In the same symbol, the DMRS of at least one UE and the uplink control information of at least another UE are provided. In other same symbol, the uplink control information of at least one UE and the DMRS of at least another UE are provided. They are multiplexed in the same resource through different CSs.

It can be known from the above that among OFDM symbols multiplexed by the uplink control information and the DMRS of different UEs, in some symbols, the DMRS of at least one UE1 and the uplink control information of at least another UE2 are multiplexed in the same resource through the CS; in another symbol, the DMRS of at least one UE2 and the uplink control information of at least another UE1 are multiplexed in the same resource through the CS. The uplink control information includes at least one of: the ACK, the NACK and the SR. They are carried through modulating onto the CS.

From the description of the above-mentioned embodiments, it will be apparent to those skilled in the art that the methods in the embodiments described above may be implemented by software plus a necessary general-purpose hardware platform, or may of course be implemented by hardware. However, in many cases, the former is a preferred implementation manner. Based on this understanding, the technical solutions of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal device (which may be a mobile phone, a computer, a server, a network device or the like) to perform the methods according to the embodiments of the present disclosure.

Embodiment Two

This embodiment further provides a device for determining a sequence group. The device is configured to implement the above-mentioned embodiments and specific embodiments. What has been described is not repeated herein. As used below, the term "module" may be software, hardware or a combination thereof capable of implementing predetermined functions. The apparatus in the embodiment described below is preferably implemented by software, but implementation by hardware or by a combination of software and hardware is also possible and conceivable.

According to an embodiment of the present disclosure, a device for determining a sequence group is further provided. The device includes a determination module and a second determination module.

The first determination module is configured to determine, for a first specified orthogonal frequency division multiplexing (OFDM) symbol, a symbol index in a scheduling unit.

The second determination module is configured to determine a sequence group used by a channel or a signal on the scheduling unit according to the symbol index.

Optionally, a second specified OFDM symbol in the channel or the signal is determined as the first specified OFDM symbol.

Optionally, a first specified OFDM symbol in the channel or the signal is determined as the second specified OFDM symbol.

Optionally, in a case where frequency hop occurs on the channel or the signal, the method further includes: according to the symbol index in the scheduling unit in a third specified OFDM symbol in one frequency hop, determining the sequence group used by the one frequency hop.

Optionally, a first OFDM symbol in the frequency hop is determined as the third specified OFDM symbol.

Optionally, it is configured by base stations on communication parties that a specified symbol in the scheduling unit is the second specified OFDM symbol.

Optionally, the step in which the specified symbol in the scheduling unit is configured by the base stations on the communication parties to be the second specified OFDM symbol includes: in a case where a plurality of channels or signals are multiplexed, the base station indicates the plurality of channels or signals to use one of the collectively multiplexed OFDM symbols as the second specified OFDM symbol.

Optionally, in a case where the channel or signal is divided into a plurality of segments, the step in which the sequence group used by the channel or the signal on the scheduling unit is determined according to the symbol index includes: for each segment of the channel or signal, taking one OFDM symbol on this segment as the second specified OFDM symbol of this segment; and determining the sequence group used by this segment of the channel or the signal according to the symbol index corresponding to the second specified OFDM symbol.

Optionally, the first determination module is configured to determine a symbol index of a first specified orthogonal frequency division multiplexing (OFDM) symbol in a scheduling unit; and the second determination module is configured to determine a sequence group used by a channel or a signal on the scheduling unit according to the symbol index.

Optionally, the second determination module is further configured to determine that a fourth specified uplink OFDM symbol in a scheduling unit where the channel or signal is located is the first specified OFDM symbol.

Optionally, the second determination module is further configured to determine that a first uplink OFDM symbol in a scheduling unit is the fourth specified uplink OFDM symbol.

Optionally, in a case where frequency hop occurs the channel or the signal, the second determination module is further configured to determine the sequence groups used by different frequency hops according to the symbol indexes of different uplink OFDM symbols in the scheduling unit.

According to an embodiment of the present disclosure, a device for determining a sequence group is further provided. The device includes a first acquisition module, a second acquisition module and a first application module.

The first acquisition module is configured to acquire a plurality of symbol groups in a scheduling unit where a channel or a signal is located.

The second acquisition module is configured to acquire a plurality of sequence groups used by the scheduling unit according to the plurality of symbol groups.

The first application module is configured to use the plurality of sequence groups on the channel or the signal according to a preset rule.

According to an embodiment of the present disclosure, a device for determining a CS is further provided. The device includes: a third determination module and a fourth determination module.

The third determination module is configured to determine a symbol index of a fifth specified orthogonal frequency division multiplexing (OFDM) symbol in a scheduling unit.

The fourth determination module is configured to determine the CS used by a channel or a signal on the scheduling unit according to the symbol index.

Optionally, the fourth determination module is further configured to determine a fifth specified OFDM symbol as the sixth specified OFDM symbol in the channel or signal.

Optionally, the fourth determination module is further configured to determine a first OFDM symbol as the sixth specified OFDM symbol in the channel or signal.

Optionally, in a case where frequency hop occurs on the channel or the signal, the fourth determination module is further configured to determine the CS used by the frequency hop according to the symbol index in the scheduling unit in a seventh specified OFDM symbol in one frequency hop.

Optionally, the fourth determination module is further configured to determine a first OFDM symbol as the seventh specified OFDM symbol in the frequency hop.

Optionally, a specified symbol in the scheduling unit is configured by base stations on communication parties as the sixth specified OFDM symbol.

Optionally, the step in which the specified symbol in the scheduling unit is configured by the base stations on the communication parties to be the sixth specified OFDM symbol includes: in a case where a plurality of channels or signals are multiplexed, the base station indicates the plurality of channels or signals to use one of the collectively multiplexed OFDM symbols as the sixth specified OFDM symbol.

Optionally, in a case where the channel or signal is divided into a plurality of segments, the step in which the CS used by the channel or the signal on the scheduling unit is determined according to the symbol index includes: for each segment of the channel or signal, taking one OFDM symbol on this segment as the sixth specified OFDM symbol of this segment; determining the CS used by this segment of the channel or the signal according to the sixth specified OFDM symbol.

Optionally, the third determination module is configured to determine a symbol index of a first specified orthogonal frequency division multiplexing (OFDM) symbol in a scheduling unit; and the fourth determination module is configured to determine a CS used by a channel or a signal on the scheduling unit according to the symbol index.

Optionally, the fourth determination module is further configured to determine that an eighth specified uplink OFDM symbol in a scheduling unit where the channel or signal is located is the fifth specified OFDM symbol.

Optionally, the fourth determination module is further configured to determine a symbol index of a first uplink symbol in a scheduling unit to be the eighth specified uplink OFDM symbol index.

Optionally, in a case where frequency hop occurs on the channel or the signal, the fourth determination module is further configured to determine the CSs used by different frequency hops according to the symbol indexes of different uplink OFDM symbols in the scheduling unit.

According to an embodiment of the present disclosure, a device for determining a CS is further provided. The device includes: a third acquisition module, a fourth acquisition module, and a second application module.

The third acquisition module is configured to acquire a plurality of symbol groups in the scheduling unit in which a channel or a signal is located.

The fourth acquisition module is configured to acquire a plurality of CSs used by the scheduling unit according to the plurality of symbol groups.

The second application module is configured to use the plurality of CSs on the channel or the signal according to a preset rule.

It is to be noted that the various modules described above may be implemented by software or hardware. Implementation by hardware may, but may not necessarily, be performed in the following manners: the various modules described above are located in a same processor, or the various modules described above are located in their respective processors in any combination form.

Embodiment Three

According to another embodiment of the present disclosure, a processor is further provided. The processor is configured to execute a program. When the program is executed, the method of any one of the optional embodiments described above is performed.

Embodiment Four

According to another embodiment of the present disclosure, a storage medium is further provided. The storage medium includes a stored program. When the program is executed, the method of any one of the optional embodiments described above is performed.

Figure 3:
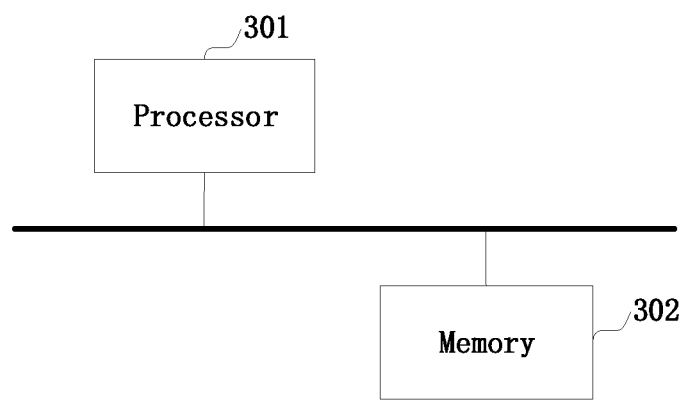
FIG. 3 is a schematic diagram of a device for determining a sequence group according to an embodiment of the present disclosure.

Apparently, it should be understood by those skilled in the art that each of the modules or steps of the device for determining a sequence group of the present disclosure described above may be implemented by a general-purpose computing apparatus, the modules or steps may be concentrated on a single computing apparatus or distributed on a network composed of multiple computing apparatuses, and alternatively, as shown in FIG. 3, the modules or steps may be implemented by program codes executable by the computing apparatus, so that the modules or steps may be stored in a storage apparatus (For example, the memory 302 shown in FIG. 3) and executed by the computing apparatus (For example, the processor 301 shown in FIG. 3). In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only embodiments of the present disclosure and are not intended to limit the present disclosure, and for those skilled in the art, the present disclosure may have various modifications and variations. Any modifications, equivalent substitutions, improvements and the like made within the spirit and principle of the present disclosure fall within the scope of the present disclosure.

What is claimed is:

1. A method for determining a sequence group, comprising:
    determining a symbol index of a first specified orthogonal frequency division multiplexing (OFDM) symbol in a scheduling unit; and
    determining a sequence group used by a channel or a signal on the scheduling unit according to the symbol index,
    wherein the sequence group used by the channel or signal is determined by the following formula according to the symbol index:

$$f_{gh}(n_s,l)=(\Sigma_{i=0}^{7}c(8(N^*n_s+l)+i)\cdot 2^i)\bmod Q;$$

$$u=(f_{gh}(n_s,l)+f_{ss})\bmod Q;$$

wherein the u denotes an index of the sequence group, Q equals to a total number of sequence groups, a definition of $f_{ss}$ is determined by a cell physical ID, $n_s$ is a serial number of the scheduling unit, and l is the symbol index of the symbol in the scheduling unit, N is a number of symbols comprised in each scheduling unit; c(i) is a pseudo-random sequence with an initial value of $$\left\lfloor \frac{n_{ID}^{RS}}{30} \right\rfloor;$$

$n_{ID}^{RS}$ is the cell physical ID of the cell, or a virtual cell physical ID configured by a higher layer.

2. The method of claim 1, wherein a second specified OFDM symbol in the channel or the signal is determined as the first specified OFDM symbol, and the first OFDM symbol in the channel or signal is determined as the second specified OFDM symbol.

3. The method of claim 2, wherein in a case where frequency hop occurs on the channel or the signal, the method further comprises:
    according to a symbol index, in the scheduling unit, of a third specified OFDM symbol in one frequency hop, determining a sequence group used by the one frequency hop,
    wherein the first OFDM symbol in the frequency hop is determined as the third specified OFDM symbol.

4. The method of claim 2, wherein a specified symbol in the scheduling unit is configured by base stations on communication parties to be the second specified OFDM symbol,
wherein configuring the specified symbol in the scheduling unit by the base stations on the communication parties to be the second specified OFDM symbol comprises:
in a case where a plurality of channels or signals are multiplexed, the base station indicates the plurality of channels or signals to use one of collectively multiplexed OFDM symbols as the second specified OFDM symbol.

5. The method of claim 2, wherein in a case where the channel or signal is divided into a plurality of segments, determining the sequence group used by the channel or the signal according to the symbol index comprises:
taking one OFDM symbol on each segment of the channel or signal as the second specified OFDM symbol of this segment; and
determining the sequence group used by this segment of the channel or the signal according to the symbol index corresponding to the second specified OFDM symbol.

6. The method of claim 2, further comprising:
determining, for each OFDM symbol in the channel or signal, the corresponding symbol index in the scheduling unit; and
determining the sequence group used by each OFDM symbol according to the symbol index.

7. The method of claim 1, further comprising: determining a fourth specified uplink OFDM symbol in the scheduling unit where the channel or the signal is located as the first specified OFDM symbol.

8. The method of claim 7, wherein a first uplink OFDM symbol in the scheduling unit is determined as the fourth specified uplink OFDM symbol.

9. The method of claim 7, wherein in a case where frequency hop occurs on the channel or the signal, the method further comprises:
determine the sequence groups used by different frequency hops according to the symbol indexes of different uplink OFDM symbols in the scheduling unit.

10. The method of claim 1, wherein the channel or signal comprises at least one of:
a physical uplink control channel;
a physical uplink shared channel;
a channel sounding reference signal (SRS); or
a mini-slot.

11. A device for determining a sequence group, comprising:
a processor; and
a memory connected to the processor for storing instructions executable by the processor,
wherein execution of the instructions by the processor causes the processor to perform a method for determining a sequence group, wherein the method comprises:
determining a symbol index of a first specified orthogonal frequency division multiplexing (OFDM) symbol in a scheduling unit; and
determining a sequence group used by a channel or a signal on the scheduling unit according to the symbol index,
wherein the sequence group used by the channel or signal is determined by the following formula according to the symbol index:

$$f_{gh}(n_s,l)=(\Sigma_{i=0}^{7}c(8(N^*n_s+l)+i)\cdot 2^i)\bmod Q;$$

$$u=(f_{gh}(n_s,l)+f_{ss})\bmod Q;$$

wherein the u denotes an index of the sequence group, Q equals to a total number of sequence groups, a definition of $f_{ss}$ is determined by a cell physical ID, $n_s$ is a serial number of the scheduling unit, and l is the symbol index of the symbol in the scheduling unit, N is a number of symbols comprised in each scheduling unit; c(i) is a pseudo-random sequence with an initial value of $$\left\lfloor \frac{n_{ID}^{RS}}{30} \right\rfloor;$$

$n_{ID}^{RS}$ is the cell physical ID of the cell, or a virtual cell physical ID configured by a higher layer.

12. The device of claim 11, wherein a second specified OFDM symbol in the channel or the signal is determined as the first specified OFDM symbol, and the first OFDM symbol in the channel or signal is determined as the second specified OFDM symbol.

13. The device of claim 12, wherein in a case where frequency hop occurs on the channel or the signal, the method further comprises:
according to a symbol index, in the scheduling unit, of a third specified OFDM symbol in one frequency hop, determining a sequence group used by the one frequency hop,
wherein the first OFDM symbol in the frequency hop is determined as the third specified OFDM symbol.

14. The device of claim 12, wherein a specified symbol in the scheduling unit is configured by base stations on communication parties to be the second specified OFDM symbol,
wherein configuring the specified symbol in the scheduling unit by the base stations on the communication parties to be the second specified OFDM symbol comprises:
in a case where a plurality of channels or signals are multiplexed, the base station indicates the plurality of channels or signals to use one of collectively multiplexed OFDM symbols as the second specified OFDM symbol.

* * * * *